US010042730B2

(12) United States Patent
Zebian

(10) Patent No.: US 10,042,730 B2
(45) Date of Patent: Aug. 7, 2018

(54) MASS STORAGE CHASSIS ASSEMBLY CONFIGURED TO ACCOMMODATE PREDETERMINED NUMBER OF STORAGE DRIVE FAILURES

(71) Applicant: HGST NETHERLANDS B.V., Amsterdam (NL)

(72) Inventor: Hussam Zebian, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 860 days.

(21) Appl. No.: 14/463,267

(22) Filed: Aug. 19, 2014

(65) Prior Publication Data
US 2016/0057883 A1    Feb. 25, 2016

(51) Int. Cl.
*G06F 11/00* (2006.01)
*G06F 11/30* (2006.01)
*G11B 33/12* (2006.01)

(52) U.S. Cl.
CPC ........ *G06F 11/3034* (2013.01); *G11B 33/128* (2013.01)

(58) Field of Classification Search
USPC .......................................... 714/6.1
See application file for complete search history.

(56) References Cited

U.S. PATENT DOCUMENTS

| | | | |
|---|---|---|---|
| 3,704,359 A * | 11/1972 | Laing .................. | F24D 13/02 165/49 |
| 5,097,366 A * | 3/1992 | Ueki .................. | G11B 33/1446 360/97.12 |
| 5,371,882 A | 12/1994 | Ludlam | |
| 5,454,157 A * | 10/1995 | Ananth ................ | G11B 33/121 29/467 |
| 5,649,093 A * | 7/1997 | Hanko ................ | G06F 11/1076 348/E7.073 |
| 5,657,439 A | 8/1997 | Jones et al. | |
| 5,941,994 A | 8/1999 | DeKoning et al. | |
| 6,078,471 A * | 6/2000 | Fiske ................... | G11B 5/4886 360/234.4 |
| 6,101,227 A * | 8/2000 | Glover ................. | G11B 20/18 375/262 |
| 6,320,744 B1 * | 11/2001 | Sullivan ................ | G06F 1/184 312/223.2 |
| 6,490,152 B1 * | 12/2002 | White .................. | G06F 1/184 361/679.32 |
| 6,889,345 B2 * | 5/2005 | Sicola ................. | G06F 11/0727 370/222 |
| 6,927,980 B2 | 8/2005 | Fukuda et al. | |

(Continued)

OTHER PUBLICATIONS

Siewert, Sam. "Disk Failures in Storage Arrays: Assurance Fault Detection Isolation Recovery (FDIR)—design for three plus year near-zero maintenance." Assurance Software and Hardware Solutions, LLC. Mar. 2008.

(Continued)

*Primary Examiner* — Amine Riad

(57) ABSTRACT

A mass storage chassis assembly configured to accommodate a predetermined number of storage drive failures is provided. The mass storage chassis assembly in one example includes a chamber, a plurality of working storage drives in the chamber, and an outside deck including one or more empty storage drive receptacles outside the chamber.

20 Claims, 8 Drawing Sheets

(56) References Cited

U.S. PATENT DOCUMENTS

| | | | |
|---|---|---|---|
| 7,304,855 B1* | 12/2007 | Milligan | G11B 33/128 361/724 |
| 7,308,600 B2 | 12/2007 | Dubal et al. | |
| 7,644,304 B2 | 1/2010 | Kotzur et al. | |
| 7,706,102 B1* | 4/2010 | Gershman | G06F 21/80 360/118 |
| 7,872,864 B2* | 1/2011 | Mongia | G06F 1/20 361/694 |
| 8,074,108 B2* | 12/2011 | Shirogane | G06F 11/1088 714/6.22 |
| 8,473,779 B2 | 6/2013 | Siewert et al. | |
| 8,638,524 B2* | 1/2014 | Brown | G11B 25/043 360/97.15 |
| 8,976,530 B2* | 3/2015 | Jeffery | G11B 33/02 361/679.33 |
| 9,001,458 B1* | 4/2015 | Vitikkate | G11B 25/043 360/97.22 |
| 9,241,427 B1* | 1/2016 | Stevens | G11B 33/142 |
| 2002/0140848 A1* | 10/2002 | Cooper | H04N 5/2252 348/373 |
| 2003/0147220 A1* | 8/2003 | Fairchild | G06F 1/184 361/726 |
| 2003/0174464 A1* | 9/2003 | Funawatari | G11B 33/08 361/679.36 |
| 2006/0212747 A1* | 9/2006 | Okamoto | G06F 11/1092 714/6.12 |
| 2007/0053154 A1* | 3/2007 | Fukuda | G11B 33/022 361/679.33 |
| 2007/0211430 A1* | 9/2007 | Bechtolsheim | H05K 7/20736 361/695 |
| 2007/0226533 A1* | 9/2007 | Hafner | G06F 11/1088 714/6.22 |
| 2008/0126839 A1 | 5/2008 | Sangapu et al. | |
| 2008/0172571 A1* | 7/2008 | Andrews | G06F 11/1076 714/6.12 |
| 2008/0212273 A1* | 9/2008 | Bechtolsheim | H05F 7/1487 361/679.33 |
| 2010/0172083 A1* | 7/2010 | Randall | G11B 33/126 361/679.31 |
| 2011/0003643 A1* | 1/2011 | Ryan | G07F 17/3223 463/43 |
| 2012/0175489 A1* | 7/2012 | Taylor | F16F 15/067 248/563 |
| 2015/0334880 A1* | 11/2015 | Best | H05K 7/20763 361/679.47 |
| 2016/0070295 A1* | 3/2016 | Brause | G11B 33/128 361/679.33 |
| 2016/0085276 A1* | 3/2016 | Lieber | G06F 1/187 361/679.31 |
| 2016/0111814 A1* | 4/2016 | Hirano | H01R 13/58 361/679.33 |
| 2016/0198565 A1* | 7/2016 | Smith | G06F 1/20 361/679.34 |
| 2016/0307606 A1* | 10/2016 | McGuire, Jr. | G11B 33/1406 |

OTHER PUBLICATIONS

Xiotech Corporation. "Emprise 5000: High-performance, low-cost storage building block." XioTech Corporation. Jun. 3, 2010.

EMC Corporation. "EMC CLARiiON Global Hot Spares and Proactive Hot Sparing: Best Practices Planning." EMC Corporation. Sep. 2009.

* cited by examiner

MASS STORAGE CHASSIS ASSEMBLY CONFIGURED TO ACCOMMODATE PREDETERMINED NUMBER OF STORAGE DRIVE FAILURES

BACKGROUND OF THE INVENTION

Field of the Invention

Aspects of the disclosure are related to the field of data storage systems, and in particular, to a mass storage chassis assembly.

Description of the Related Art

Mass storage systems are used for storing enormous quantities of digital data. As computer systems and networks grow in numbers and capability, there is a need for more and more storage system capacity. Cloud computing and large-scale data processing have further increase the need for digital data storage systems that are capable of transferring and holding immense amounts of data.

Mass storage systems are typically formed from a large number of mass storage devices. A mass storage chassis assembly is a modular unit that holds and operates a number of storage devices, such as Hard Disk Drives (HDDs), for example. The capacity of a mass storage system can be increased in large increments by the installation of an additional mass storage chassis assembly or assemblies to a rack or other support structure.

The storage devices of a mass storage chassis assembly can be organized and held in sub-assemblies. In some examples, subsets of storage devices are held in mass storage sub-assemblies that are added to the mass storage chassis assembly. A mass storage sub-assembly can comprise a closed assembly, wherein it is difficult or impossible to replace storage devices inside the sub-assembly.

SUMMARY OF THE INVENTION

A mass storage chassis assembly configured to accommodate a predetermined number of storage drive failures is provided. The mass storage chassis assembly in one example includes a chamber, a plurality of working storage drives in the chamber, and an outside deck including one or more empty storage drive receptacles outside the chamber.

DETAILED DESCRIPTION OF THE INVENTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
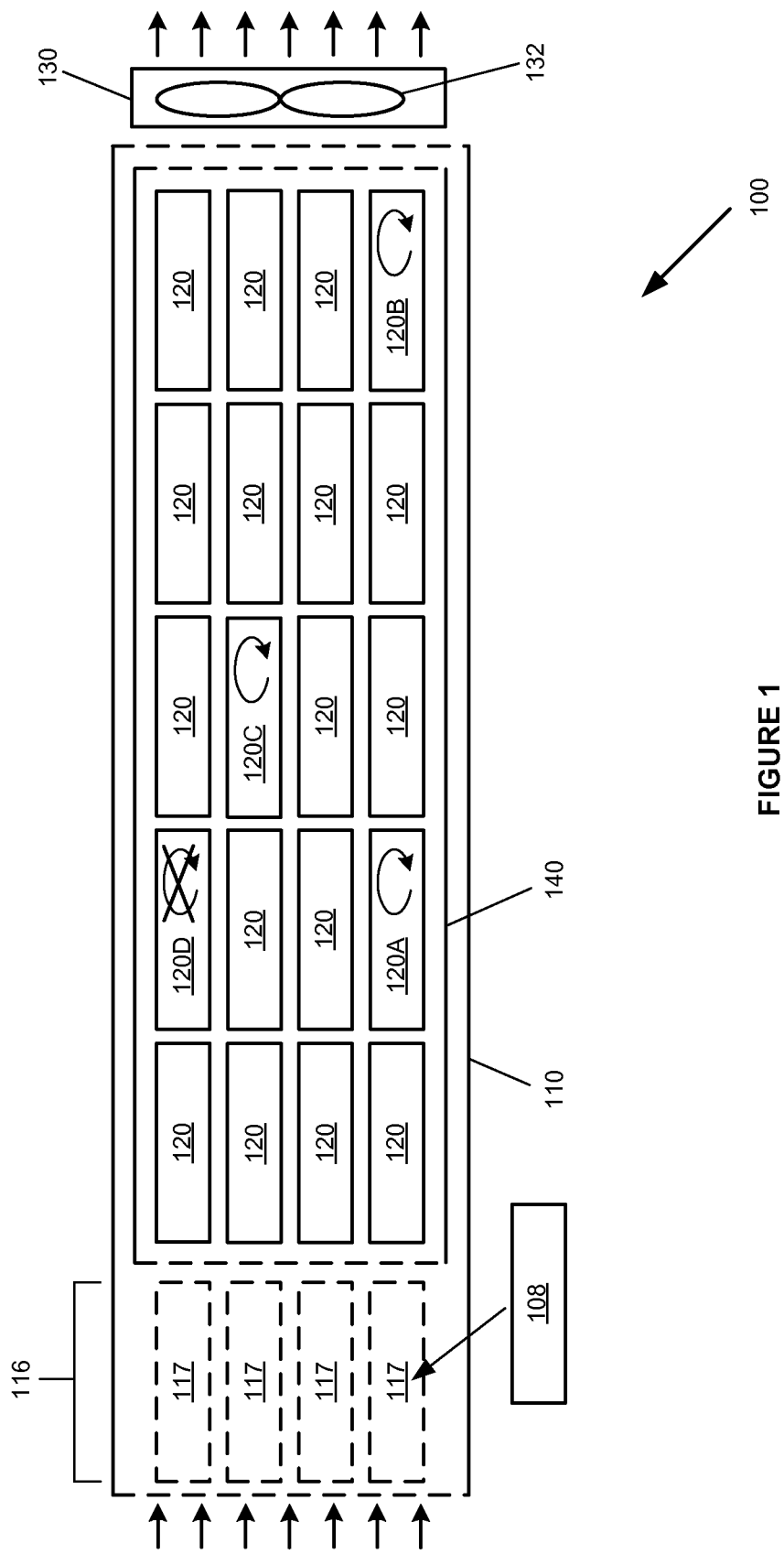
FIG. 1 shows a mass storage chassis assembly configured to accommodate a predetermined number of storage drive failures.

FIG. 1 shows a mass storage chassis assembly 100 configured to accommodate a predetermined number of storage drive failures. The mass storage chassis assembly 100 in the example shown comprises a chassis tray 110, a chamber 140, and a plurality of working storage drives 120 received in the chamber 140. The plurality of working storage drives 120 are shown standing upright in the example. However, the plurality of working storage drives 120 can be oriented in other ways and are not limited to an upright orientation.

The plurality of working storage drives 120 in some examples comprise storage devices including one or more disk storage media. The plurality of working storage drives 120 in some examples include solid-state digital storage elements. Alternatively, the plurality of working storage drives 120 can comprises hybrid drives including both one or more disk storage media and solid-state digital storage elements.

The mass storage chassis assembly 100 includes a front region 101 and a rear region 102. The mass storage chassis assembly 100 further includes a fan unit 130 at the rear region 102 in some examples. The fan unit 130 includes one or more fans 132 that create airflow. The airflow travels into the front region 101 of the mass storage chassis assembly 100 and exits the rear region 102. The airflow in some examples is drawn through the chamber 140 and is drawn around the plurality of working storage drives 120 as the airflow travels through the mass storage chassis assembly 100. As can be seen in the figure, the chamber 140 can include openings that allow the airflow to pass through the chamber 140. Alternatively, such as where the chamber 140 is closed or sealed, the airflow is drawn around the chamber 140 as the airflow travels through the mass storage chassis assembly 100. In another alternative, a helium seal can be implemented around each individual storage drive 120 instead of around multiple drives; in such an assembly the airflow passes through chamber 140 and around the helium seal of the individual storage drive or drives 120.

The plurality of working storage drives 120 in some examples are organized into rows. Alternatively, the plurality of working storage drives 120 can be arranged in other ways or can be arranged without any pattern or plan.

In the example, the mass storage chassis assembly 100 includes twenty working storage drives 120. In the example, four storage drives 120A-120D are currently operating, as denoted by the circular arrow symbols that show disk rotation in the four storage drives 120A-120D. However, the storage drive 120D comprises a failed storage drive. The failed storage drive 120D is denoted by a circular arrow combined with an X. The failed storage drive 120D is non-operational, is not reliably operational, or is suffering from some other form of error or improper operation (including intermittent operational problems). Consequently, the failed storage drive 120D can no longer be used to store data.

The mass storage chassis assembly 100 includes the chamber 140 enclosing at least a portion of the plurality of working storage drives 120. In examples where the mass storage chassis assembly 100 includes the fan unit 130, airflow through or around the chamber 140 transfers heat away from the storage drives 120.

The chamber 140 holds the plurality of working drives 120. In some examples the chamber 140 is not sealed, but nevertheless presents a difficulty in accessing and replacing working storage drives 120. In such examples, at least some of the airflow travels through the chamber 140. The chamber 140 in other examples comprises a hermetically-sealed chamber 140. The hermetically-sealed chamber 140 in some examples is filled with a predetermined gas or gas mixture, such as helium, for example. The predetermined gas or gas mixture can provide benefits, such as predetermined gas densities, gas resistance properties, or gas thermal characteristics, for example. Where the chamber 140 comprises a hermetically-sealed chamber 140, the airflow travels around the hermetically-sealed chamber and removes heat from the hermetically-sealed chamber 140.

The mass storage chassis assembly 100 in this example further includes a outside deck 116 that is outside the chamber 140. The outside deck 116 comprises one or more empty drive receptacles 117. Alternatively, in other examples the outside deck 116 includes at least one empty storage drive receptacle 117 and at least one working storage drive 120.

A replacement storage drive 108 can be added to an empty drive receptacle 117 of the outside deck 116. The mass storage chassis assembly 100 is then reconfigured to use the replacement storage drive 108 in place of the working storage drive 120D.

In some examples, the mass storage chassis assembly 100 is configured to detect a failed storage drive 109 in the plurality of working storage drives 120 in the chamber 140, detect the replacement storage drive 108 added to the storage drive receptacle 117, and reconfigure the replacement storage drive 108 to comprise a new working storage drive 120D to replace the failed storage drive 109.

The chamber 140 makes replacement or repair of a storage drive 120 difficult. Where the plurality of working storage drives 120 are located within the chamber 140, replacement of storage drives is difficult, if not impossible. Instead, the mass storage chassis assembly 100 in some examples is designed to accommodate a predetermined number of storage drive failures. The predetermined number of storage drive failures in some examples corresponds to a predicted or expected number of storage drive failures.

In addition, replacing a failed storage drive is costly and time-consuming. Sliding a mass storage chassis assembly 100 (or sub-assembly 150) out from a support rack can generate unwanted vibrations in the storage drives and can interfere with the accuracy of data transfer operations. Further, such maintenance occurs in a hot environment, posing danger to a technician. Such maintenance may require a technician to work on a mass storage chassis assembly 100 where electrical power has not been removed or cannot be removed.

A mass storage chassis assembly 100 designed to allow swapping internal storage drives requires significant added components and wastes space and heat transfer surface areas. A swappable design requires much more research, engineering, manufacturing, and operation efforts, all while being significantly less efficient in cooling and vibration isolation, leading to a lower density system. Even the conventional alternative of a hot-swappable, fail-in-place design, where a failed storage drive is left in place, wastes space by demanding the internal inclusion of a large number of idle drives to replace working storage drives in the event of failure. The number of idle (i.e., spare) storage drives is generally determined by stochastic analysis of a storage drive failure rate and safety margin, leading to the use of a larger number of idle storage drives than the actual failure rate. Due to the large number of idle storage drives, which are basically an incurred cost on the manufacturer, and the low density of the storage system, incurred by the user, the fail-in-place concept has long been considered unfavorable and is therefore relatively rare. The mass storage chassis assembly 100 solves the problems faced in the past by swappable and fail-in-place mass storage system approaches.

Figure 2:
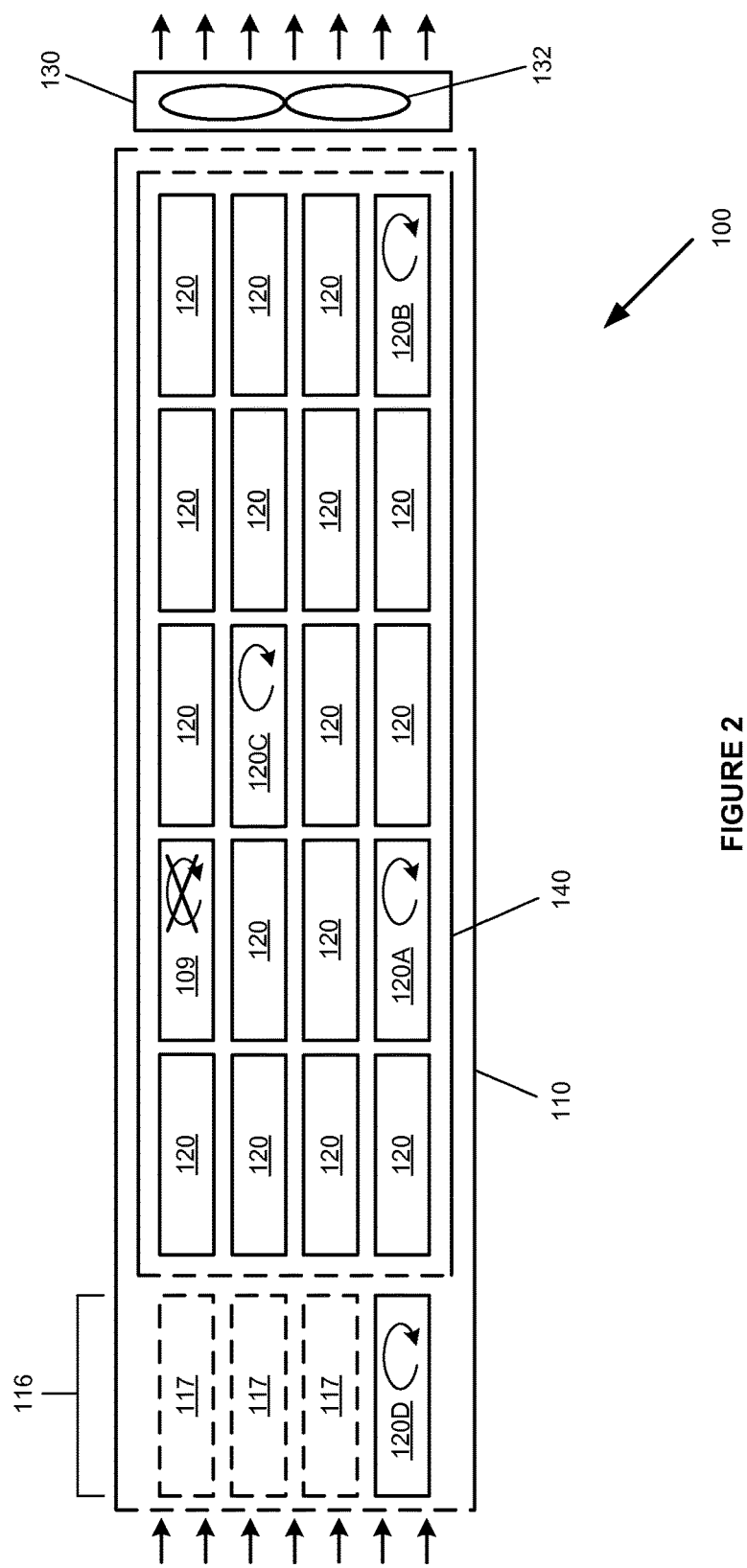
FIG. 2 shows the mass storage chassis assembly wherein a replacement storage drive now comprises a working storage drive.

FIG. 2 shows the mass storage chassis assembly 100 wherein the replacement storage drive 108 now comprises the working storage drive 120D. In addition, the former working storage drive 120D now comprises the failed storage drive 109. The replacement storage drive is now depicted with a circular arrow to show that the mass storage chassis assembly 100 has been re-configured to comprise a working storage drive, replacing the failed storage drive 109. The mass storage chassis assembly 100 has been reconfigured to employ the replacement storage drive as the working storage drive 120D in place of the failed storage drive 109. As a result, the mass storage chassis assembly 100 still includes twenty working storage drives.

Figure 3:
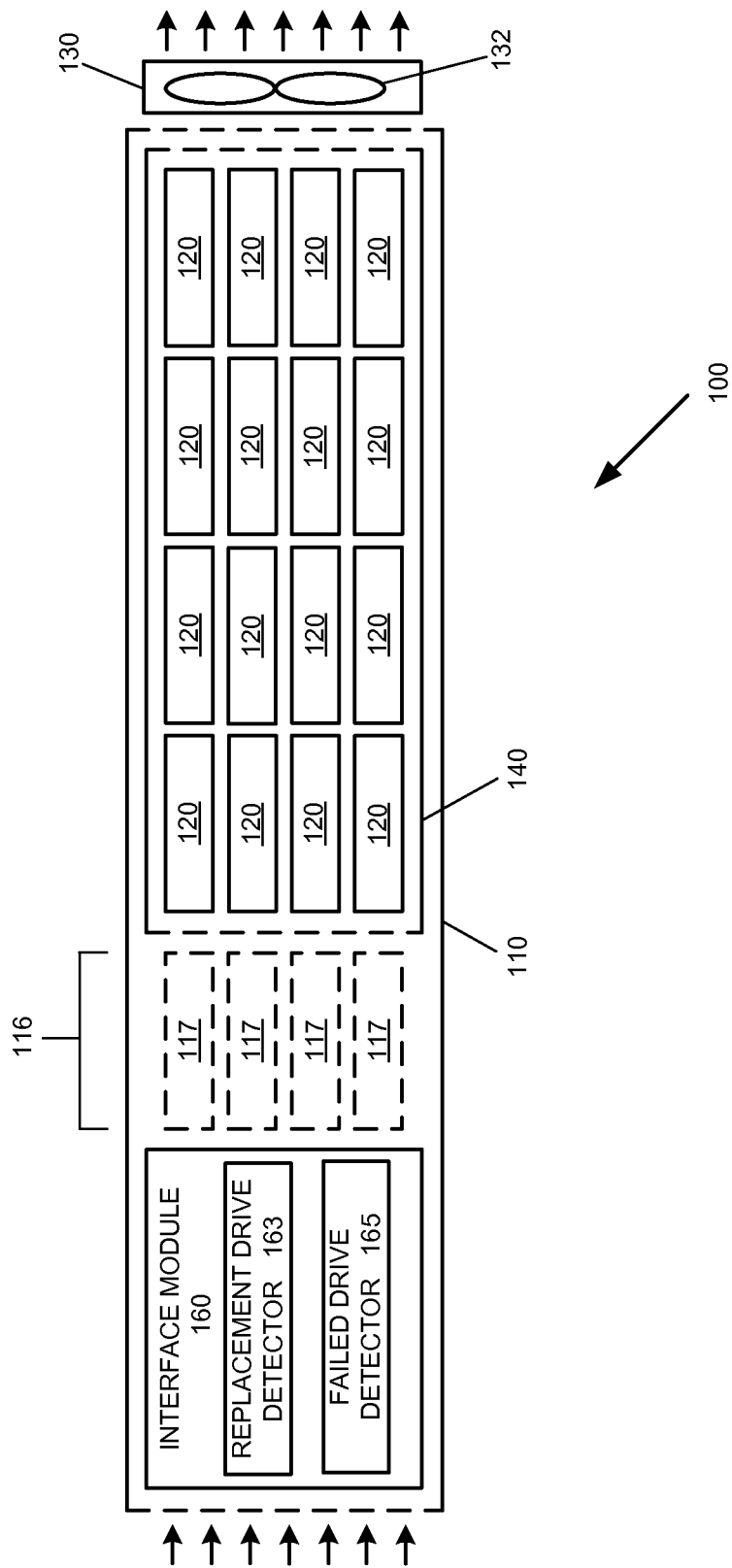
FIG. 3 shows the mass storage chassis assembly including an interface module that interfaces to the mass storage chassis assembly.

FIG. 3 shows the mass storage chassis assembly 100 including an interface module 160 that interfaces to the mass storage chassis assembly 100. The interface module 160 interfaces between the mass storage chassis assembly 100 and an external device, system, bus, or other communication link or communication system. The interface module 160 includes a main connector that is externally available and is configured to couple to an external device, system, bus, or other communication system or communication link. The interface module 160 includes a plurality of device connectors configured to couple to the plurality of working storage drives 120 and to any empty receptacles 117. The interface module 160 may be located at a front of the mass storage chassis assembly 100, as shown. Alternatively, the interface module 160 may be located at other locations within the mass storage chassis assembly 100. The interface module 160 is not necessarily to scale, and does not block or interfere with the airflow through the mass storage chassis assembly 100. The interface module 160 can be included in the mass storage chassis assembly 100 in any of the examples herein.

The interface module 160 includes a replacement drive detector 163 and a failed drive detector 165. The replacement drive detector 163 is configured to detect a replacement storage drive 108 added to the mass storage chassis assembly 100. The replacement drive detector 163 in some examples is configured to detect a replacement storage drive 108 added to the chamber 140 of the mass storage chassis assembly 100. The replacement drive detector 163 in some examples is configured to detect a replacement storage drive 108 added to the outside deck 116 of the mass storage chassis assembly 100. The replacement drive detector 163 in some examples is configured to reconfigure the replacement storage drive 108 to operate in place of the failed storage drive 109.

The failed drive detector 165 is configured to detect a failed storage drive of the working storage drives 120 within the chamber 140 of the mass storage chassis assembly 100. The failed drive detector 165 in some examples is configured to detect a failed storage drive of one or more of the working storage drives 120 within the outside deck 116 of the mass storage chassis assembly 100.

Figure 4:
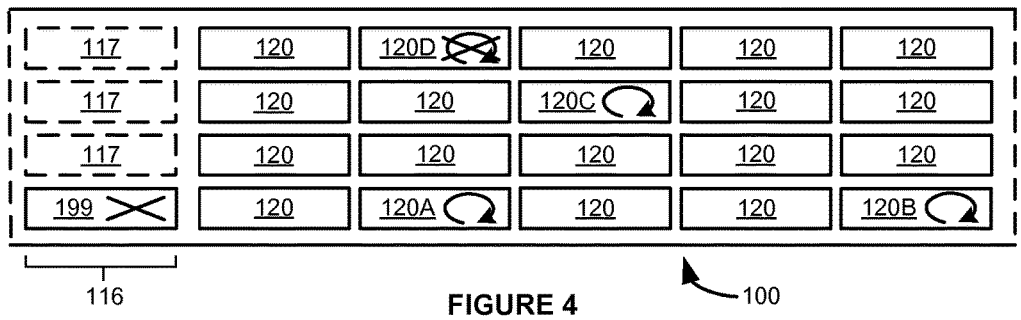
FIG. 4 shows a mass storage chassis assembly comprising a chassis tray and a plurality of working storage drives.

FIGS. 4-7 show a storage drive replacement sequence in one example. FIG. 4 shows a mass storage chassis assembly 100 comprising a chassis tray 110 and a plurality of working storage drives 120. In some examples, the plurality of working storage drives 120 are organized into rows. Alternatively, the plurality of working storage drives 120 can be arranged in other ways or can be arranged without any pattern or plan. The mass storage chassis assembly 100 in this example further includes an outside deck 116. The outside deck 116 comprises one or more empty drive receptacles 117, including a partially empty or completely empty plurality of receptacles 117. Alternatively, in other examples the outside deck 116 includes at least one empty storage drive receptacle 117 and at least one working storage drive 120.

The figure shows the mass storage chassis assembly 100 where the working storage drive 120D is not functioning or is not functioning properly or reliably. The mass storage chassis assembly 100 in this example includes at least one spare storage drive 199, with the at least one spare storage drive 199 being located in the outside deck 116. The spare storage drive 199 is shown with an X to indicate it is not currently a working storage drive. The inclusion of at least one empty drive receptacle 117 in the mass storage chassis assembly 100 can also be employed to add a replacement storage drive 108.

In some examples, the mass storage chassis assembly 100 is configured to detect a failed storage drive 109 in the plurality of working storage drives 120, detect a spare storage drive 199 included in a storage drive receptacle 117 of the outside deck 116, and reconfigure the spare storage drive 199 to comprise a new working storage drive 120D to replace the failed storage drive 109. In some examples, the mass storage chassis assembly 100 is configured to detect a failed storage drive 109 in the plurality of working storage drives 120, detect a spare storage drive 199 included in a storage drive receptacle 117 of the outside deck 116, reconfigure the spare storage drive 199 to comprise a new working storage drive 120D to replace the failed storage drive 109, and reconfigure a working storage drive 120 to comprise a new spare storage drive 199.

Figure 5:
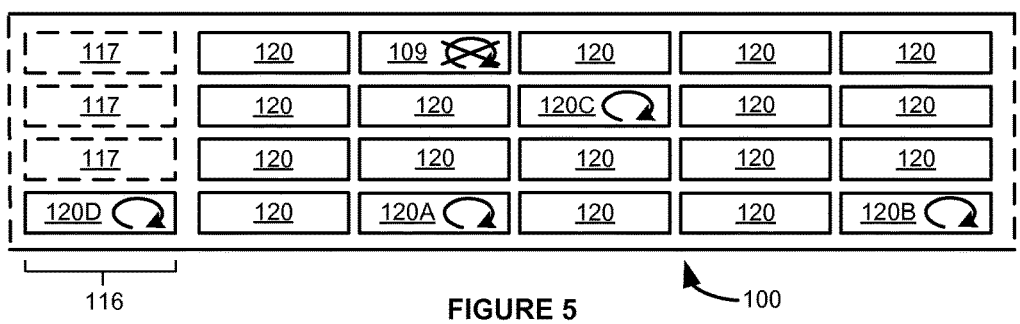
FIG. 5 shows the mass storage chassis assembly where a formerly working storage drive has been determined to comprise a failed storage drive.

FIG. 5 shows the mass storage chassis assembly 100 where the formerly working storage drive 120D has been determined to comprise a failed storage drive 109. In addition, the spare storage drive 199 of FIG. 4 has been reconfigured to comprise the new working storage drive 120D. The number of working storage drives has therefore been maintained, wherein the new working storage drive is used in place of the previous working storage drive.

Figure 6:
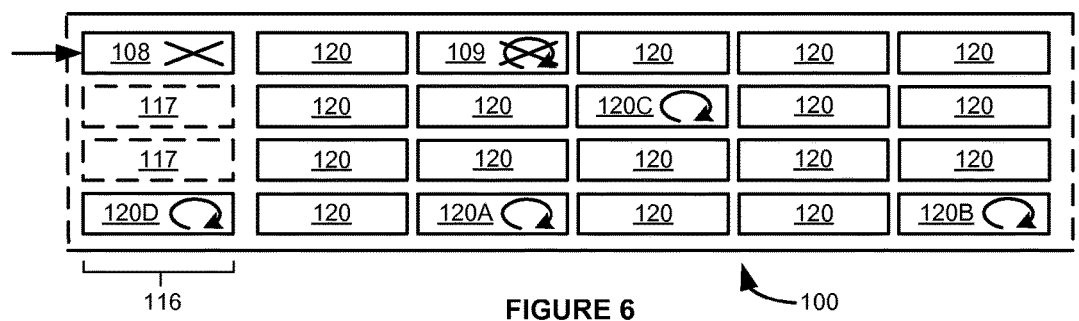
FIG. 6 shows the mass storage chassis assembly where a replacement storage drive has been added into an empty storage drive receptacle in a front row.

FIG. 6 shows the mass storage chassis assembly 100 where a replacement storage drive 108 has been added into an empty storage drive receptacle 117 in the outside deck 116. The replacement storage drive 108 therefore comprises a spare storage drive. In this figure, the replacement storage drive 108 is currently unused. The original spare storage drive 199 of FIG. 4 is still being used as the working storage drive 120D.

Figure 7:
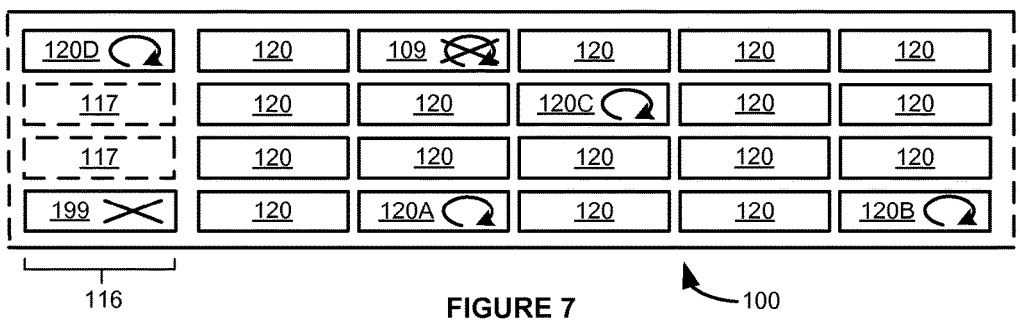
FIG. 7 shows the mass storage chassis assembly wherein the original spare storage drive has been recovered.

FIG. 7 shows the mass storage chassis assembly 100 wherein the original spare storage drive 199 has been recovered. The original spare storage drive 199 is again shown with an X to indicate it is not currently a working storage drive. In its place, the mass storage chassis assembly 100 has been reconfigured to use the replacement storage drive 108 as the working storage drive 120D. As a result, the spare storage drive 199 can be saved for future use, as needed. In addition, if an external drive fails (i.e., a working storage drive 120 in the outside deck 116), the slot can be re-emptied after rebuilding the failed storage drive, which further increases the adaptability of the mass storage chassis assembly 100.

Figure 8:
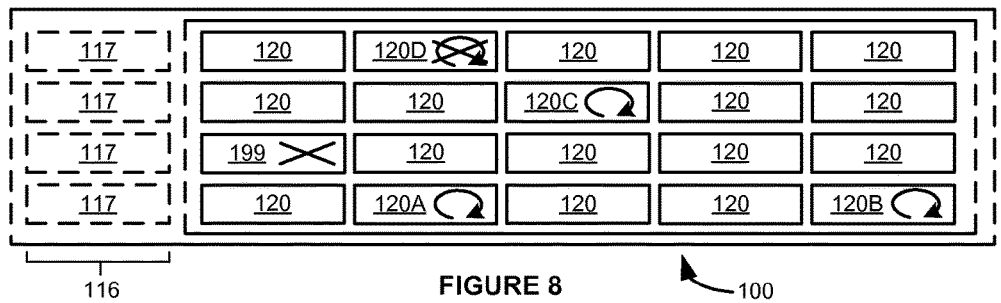
FIG. 8 shows the mass storage chassis assembly comprising a chassis tray, a chamber, and a plurality of working storage drives received in the chamber.

FIGS. 8-11 show a storage drive replacement sequence in another example. FIG. 8 shows a mass storage chassis assembly 100 comprising a chassis tray 110, a chamber 140, and a plurality of working storage drives 120 received in the chamber 140. The mass storage chassis assembly 100 in this example further includes an outside deck 116 outside the chamber 140. The outside deck 116 comprises one or more empty drive receptacles 117, including a partially empty or completely empty plurality of receptacles 117. Alternatively, in other examples the outside deck 116 includes at least one empty storage drive receptacle 117 and at least one working storage drive 120.

The figure shows the mass storage chassis assembly 100 where the working storage drive 120D is not functioning or is not functioning properly or reliably. The mass storage chassis assembly 100 in this example includes at least one spare storage drive 199, with the at least one spare storage drive 199 being located inside the chamber 140. The spare storage drive 199 is shown with an X to indicate it is not currently a working storage drive. A single spare storage drive inside the chamber 140 provides an immediate and temporary replacement of a failed storage drive until an external storage drive can be installed (or rebuilt and installed). The inclusion of at least one empty drive receptacle 117 in the mass storage chassis assembly 100 can also be employed to add a replacement storage drive 108.

In some examples, the mass storage chassis assembly 100 is configured to detect a failed storage drive 109 in the plurality of working storage drives 120 in the chamber 140, detect a replacement storage drive 108 added to a storage drive receptacle 117, and reconfigure the replacement storage drive 108 to comprise a new working storage drive 120D to replace the failed storage drive 109 within the chamber 140. In some examples, the mass storage chassis assembly 100 is configured to detect a failed storage drive 109 in the plurality of working storage drives 120 in the chamber 140, detect a replacement storage drive 108 added to a storage drive receptacle 117, reconfigure the replacement storage drive 108 to comprise a new working storage drive 120D to replace the failed storage drive 109 within the chamber 140, and reconfigure a working storage drive 120 within the chamber 140 to comprise a new spare storage drive 199.

Figure 9:
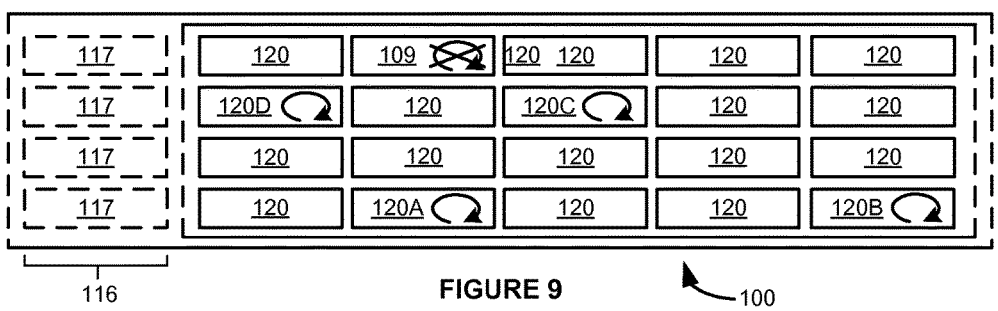
FIG. 9 shows the mass storage chassis assembly where a formerly working storage drive has been determined to comprise a failed storage drive.

FIG. 9 shows the mass storage chassis assembly 100 where the formerly working storage drive 120D within the chamber 140 has been determined to comprise a failed storage drive 109. In addition, the spare storage drive 199 of FIG. 8 has been reconfigured to comprise a new working storage drive 120D. The number of working storage drives has therefore been maintained, wherein the new working storage drive is used in place of the previous working storage drive. Advantageously, the reconfiguring does not require opening the chamber 140, while providing immediate recovery of data without interruption and without waiting for a replacement storage drive 108 to be installed in a receptacle 117 of the outside deck 116.

Figure 10:
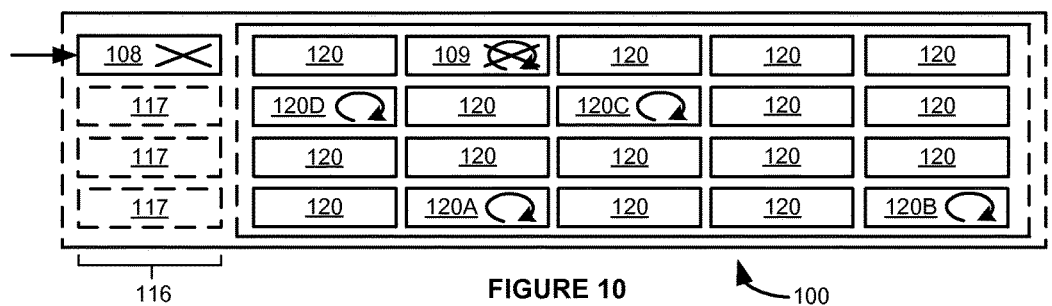
FIG. 10 shows the mass storage chassis assembly where a replacement storage drive has been added into an empty storage drive receptacle in the front row.

FIG. 10 shows the mass storage chassis assembly 100 where a replacement storage drive 108 has been added into an empty storage drive receptacle 117 in the outside deck 116. The replacement storage drive 108 therefore comprises a spare storage drive. The replacement storage drive 108 is outside the chamber 140. In this figure, the replacement storage drive 108 is currently unused. The original spare storage drive 199 of FIG. 8 is still being used as the working storage drive 120D.

Figure 11:
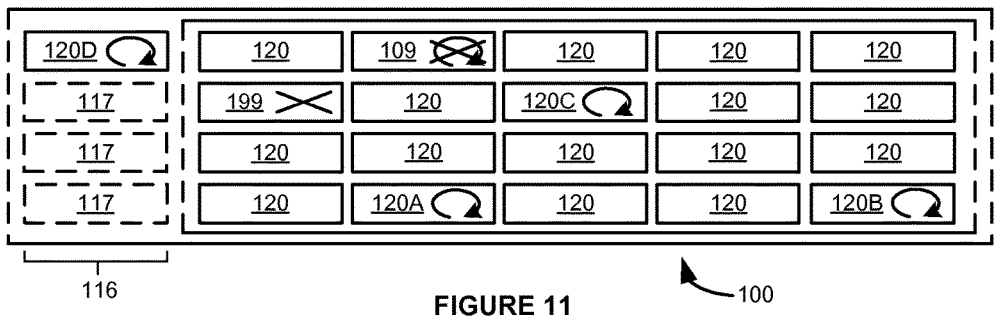
FIG. 11 shows the mass storage chassis assembly wherein the original spare storage drive within the chamber has been recovered.

FIG. 11 shows the mass storage chassis assembly 100 wherein the original spare storage drive 199 within the chamber 140 has been recovered. The original spare storage drive 199 is again shown with an X to indicate it is not currently a working storage drive. In its place, the mass storage chassis assembly 100 has been reconfigured to use the replacement storage drive 108 as the working storage drive 120D, with the replacement storage drive 108 being outside the chamber 140. As a result, the spare storage drive 199 can be saved for future use, as needed. In addition, if an external drive fails (i.e., a working storage drive 120 in the outside deck 116 fails), the receptacle 117 can be re-emptied after rebuilding the failed storage drive, which further increases the adaptability of the mass storage chassis assembly 100.

Figure 12:
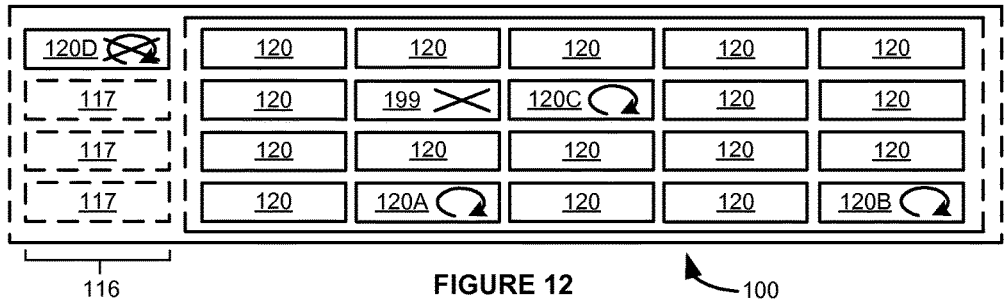
FIG. 12 shows the mass storage chassis assembly where a working storage drive in the front row is not functioning or is not functioning properly or reliably.

FIGS. 12-15 show a replacement sequence where a replacement storage drive 108 is being replaced. FIG. 12 shows the mass storage chassis assembly 100 where a working storage drive 120D in the outside deck 116 is not functioning or is not functioning properly or reliably. The mass storage chassis assembly 100 in this example includes at least one spare storage drive 199 located in the chamber 140. The spare storage drive 199 is shown with an X to indicate it is not currently a working storage drive.

Figure 13:
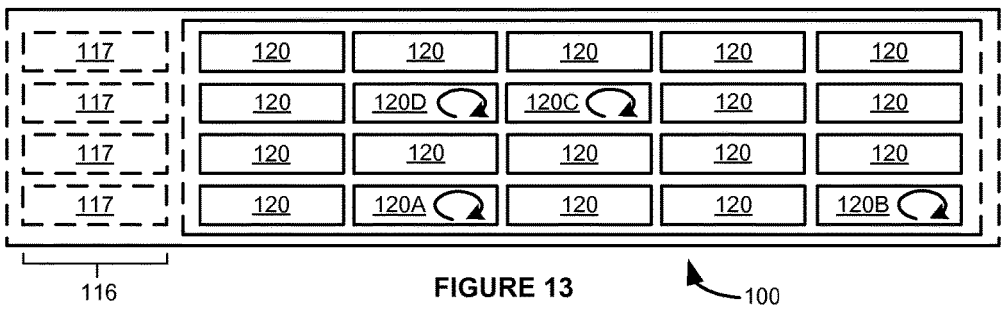
FIG. 13 shows the mass storage chassis assembly where the formerly working storage drive has been removed, such as for repair or replacement, for example.

FIG. 13 shows the mass storage chassis assembly 100 where the formerly working storage drive 120D has been removed, such as for repair or replacement, for example. In addition, the spare storage drive 199 of FIG. 12 has been reconfigured to comprise the new working storage drive 120D. Advantageously, the reconfiguring enables continued operation of the mass storage chassis assembly 100.

Figure 14:
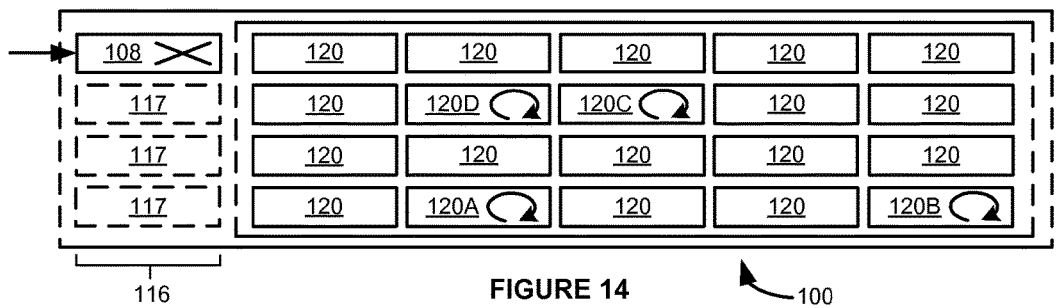
FIG. 14 shows the mass storage chassis assembly where a new replacement storage drive has been added into an empty storage drive receptacle.

FIG. 14 shows the mass storage chassis assembly 100 where a new replacement storage drive 108 has been added into an empty storage drive receptacle 117. The empty storage drive receptacle 117 can be the same or different from the receptacle that held the working storage drive 120D in FIG. 12. In this figure, the replacement storage drive 108 is currently unused and the original spare storage drive 199 of FIG. 12 is still being used as the working storage drive 120D.

Figure 15:
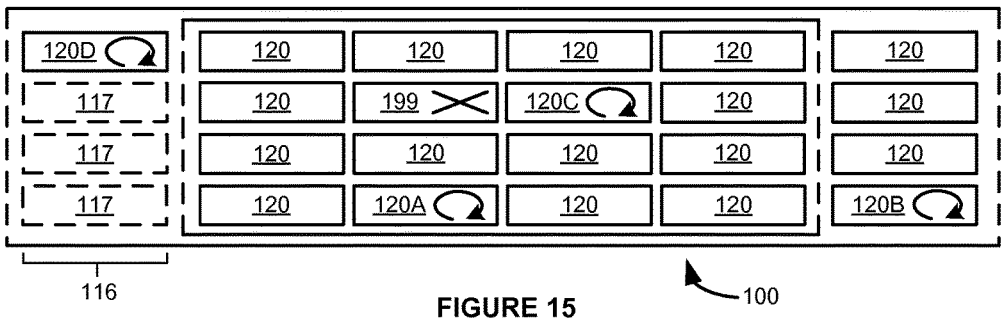
FIG. 15 shows the mass storage chassis assembly wherein the original spare storage drive within the front row has been recovered.

FIG. 15 shows the mass storage chassis assembly 100 wherein the original spare storage drive 199 in the chamber 140 has been recovered. The original spare storage drive 199 is again shown with an X to indicate it is not currently a working storage drive. In its place, the mass storage chassis assembly 100 has been reconfigured to use the replacement storage drive 108 as the working storage drive 120D. As a result, the spare storage drive 199 can be saved for future use, as needed.

Figure 16:
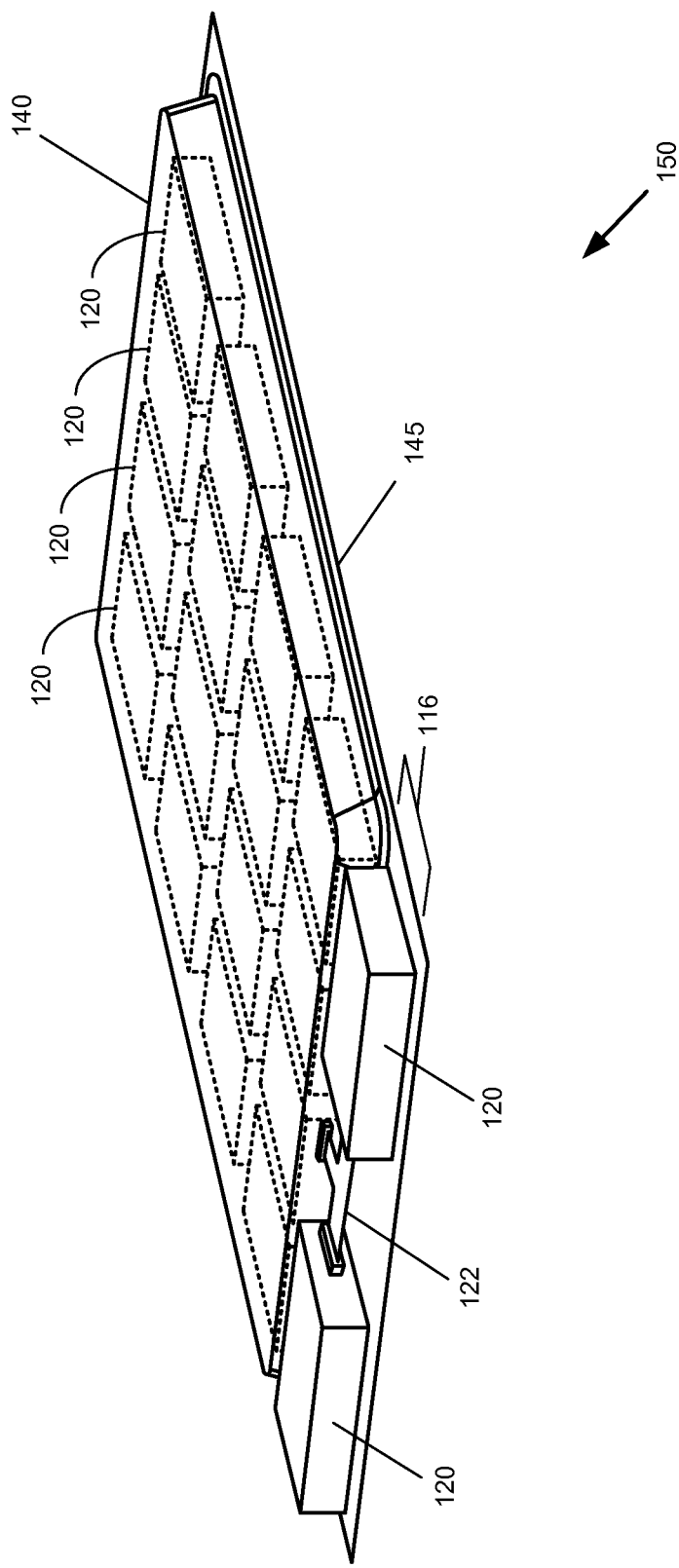
FIG. 16 shows a mass storage sub-assembly for a mass storage chassis assembly.

FIG. 16 shows a mass storage sub-assembly 150 for a mass storage chassis assembly 100. The mass storage sub-assembly 150 comprises a support member 145 and a chamber 140 located on the support member 145. In some examples, the support member 145 comprises a substantially rigid and substantially planar member configured to support the chamber 140. In some examples, the chamber 140 is affixed to the support member 145, such as to complete the chamber 140.

The chamber 140 in some examples is not sealed, as previously discussed. Alternatively, the chamber 140 in other examples comprises a hermetically-sealed chamber 140. The hermetically-sealed chamber 140 in some examples is filled with a predetermined gas or gas mixture, such as helium.

A plurality of working storage drives 120 are located within the chamber 140. In this example, the plurality of working storage drives 120 are positioned substantially horizontally, instead of vertically, as shown in FIG. 1, for example.

The mass storage sub-assembly 150 further comprises one or more external storage drives 120 located on the support member 145, but outside the chamber 140. The one or more external storage drives 120 are organized into the outside deck 116 of the mass storage sub-assembly 150. The outside deck 116 in this example comprises an already-filled outside deck 116, but alternatively could include one or more empty receptacles 117.

The one or more external storage drives 120 are electrically coupled by an interconnect member 122. The one or more external storage drives 120 are further electrically coupled by the interconnect member 122 to the plurality of working storage drives 120 inside the chamber 140.

Figure 17:
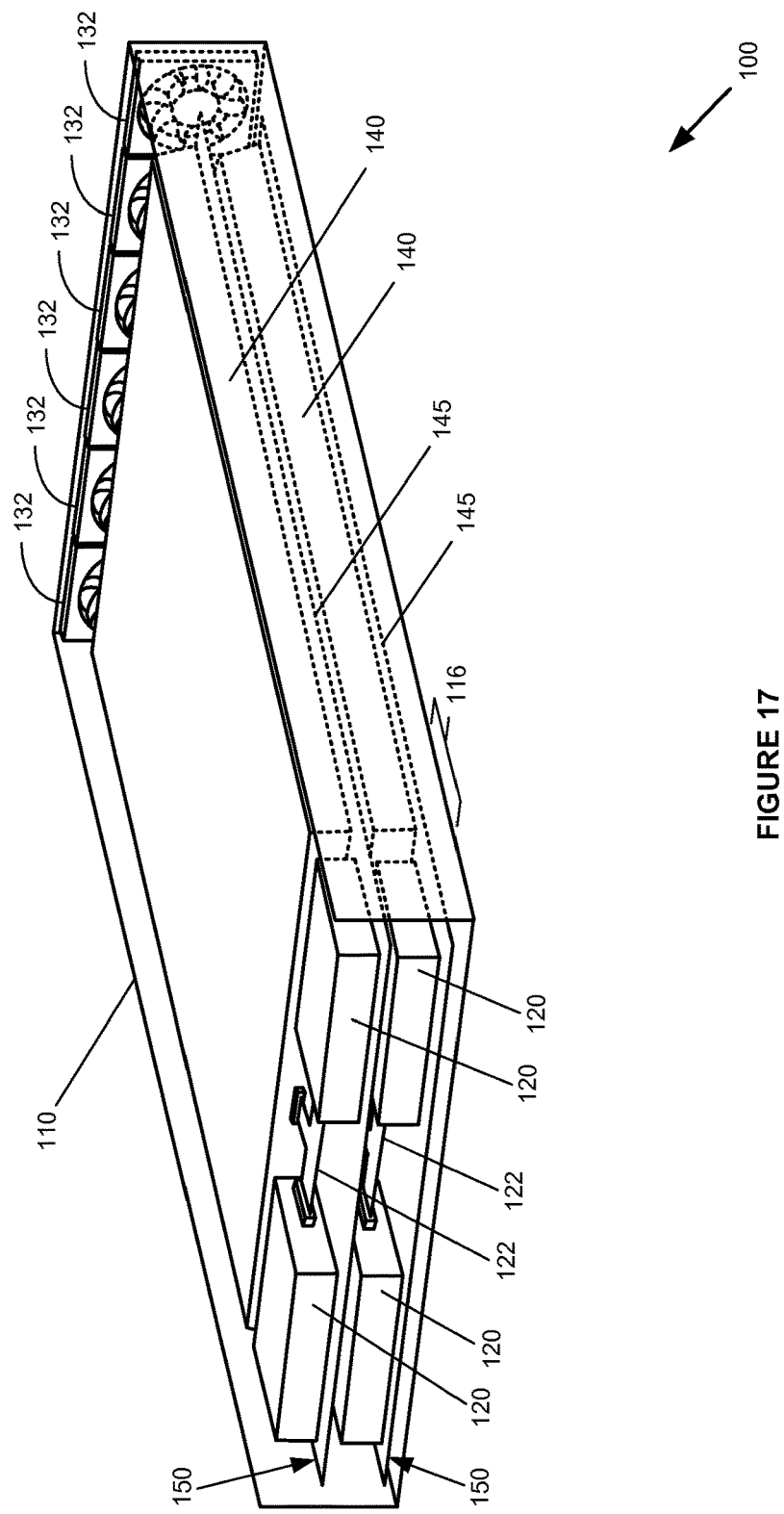
FIG. 17 shows a mass storage chassis assembly including multiple mass storage sub-assemblies.

FIG. 17 shows the mass storage chassis assembly 100 including multiple mass storage sub-assemblies 150. The multiple mass storage sub-assemblies 150 are vertically arranged within a chassis tray 110 of the mass storage chassis assembly 100. The outside decks 116 of the multiple mass storage sub-assemblies 150 are located at a front of the mass storage chassis assembly 100. One or more fans 132 are located at a rear of the mass storage chassis assembly 100.

In some examples, the mass storage chassis assembly 100 comprises a cold storage chassis assembly 100. A cold storage chassis assembly 100 stores digital data that is infrequently accessed. In a cold storage chassis assembly 100, only a small percentage of the storage drives may be operating at any given time. Alternatively, the mass storage chassis assembly 100 comprises a continuously-operated storage system.

While the present invention has been particularly shown and described with reference to the preferred implementations, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A mass storage assembly, comprising:
a chassis comprising:
a hermetically-sealed chamber filled with helium gas and enclosing a plurality of non-hermetically-sealed storage drives; and
a non-hermetically-sealed outside deck comprising one or more empty storage drive receptacles outside the hermetically-sealed chamber, wherein:
the one or more empty storage drive receptacles are configured to accommodate one or more replacement storage drives without having to open the hermetically-sealed chamber; and
the one or more replacement storage drives operate in place of one or more of the plurality of non-hermetically-sealed storage drives within the hermetically-sealed chamber, thereby accommodating a predetermined number of storage drive failures that occur within the hermetically-sealed chamber.

2. The mass storage assembly of claim 1, further comprising a replacement storage drive installed in a storage drive receptacle of the one or more empty storage drive receptacles.

3. The mass storage assembly of claim 1, further comprising a failed drive detector configured to detect a failure of one or more of the storage drives in the hermetically-sealed chamber.

4. The mass storage assembly of claim 1, further comprising a replacement drive detector configured to:
detect a replacement storage drive installed in a storage drive receptacle among the one or more empty storage drive receptacles; and
reconfigure the replacement storage drive to operate in place of a failed storage drive among the plurality of non-hermetically-sealed storage drives in the hermetically-sealed chamber.

5. The mass storage assembly of claim 1, further comprising at least one spare storage drive included in the hermetically-sealed chamber along with the plurality of non-hermetically-sealed storage drives, wherein the at least one spare storage drive is configured to be used in place of a failed storage drive within the hermetically-sealed chamber.

6. The mass storage assembly of claim 1, further comprising at least one spare storage drive included in the hermetically-sealed chamber along with the plurality of non-hermetically-sealed storage drives, wherein:
the at least one spare storage drive is configured to be used in place of a failed storage drive within the hermetically-sealed chamber; and
the at least one spare storage drive comprises a predetermined number of spare storage drives corresponding to the predetermined number of storage drive failures.

7. The mass storage assembly of claim 1, further comprising a fan unit configured to create airflow through the mass storage assembly and around an outside of the hermetically-sealed chamber.

8. The mass storage assembly of claim 1, further comprising:
an interface module configured to communicatively couple an external system to at least the plurality of non-hermetically-sealed storage drives enclosed in the hermetically-sealed chamber.

9. The mass storage assembly of claim 1, wherein the hermetically-sealed chamber is filled with a further gas or gas mixture.

10. The mass storage assembly of claim 1, wherein the mass storage assembly is further configured to configure a selected replacement storage drive inserted into the non-hermetically-sealed outside deck as a replacement for at least one of the non-hermetically-sealed storage drives within the hermetically-sealed chamber.

11. A storage assembly, comprising:
a chassis comprising a hermetically-sealed chamber filled with helium gas and enclosing a plurality of non-hermetically-sealed storage drives; and
a non-hermetically-sealed outside deck including one or more empty storage drive receptacles outside the hermetically-sealed chamber configured to accommodate one or more replacement storage drives without having to open the hermetically-sealed chamber and that operate in place of one or more of the plurality of non-hermetically-sealed storage drives within the hermetically-sealed chamber thereby accommodating a predetermined number of storage drive failures that occur within the hermetically-sealed chamber.

12. The storage assembly of claim 11, further comprising a replacement storage drive installed in a storage drive receptacle of the one or more empty storage drive receptacles.

13. The storage assembly of claim 11, further comprising a failed drive detector configured to detect a failure of one or more of the plurality of non-hermetically-sealed storage drives in the hermetically-sealed chamber.

14. The storage assembly of claim 11, further comprising a replacement drive detector configured to:
detect a replacement storage drive installed in a storage drive receptacle among the one or more empty storage drive receptacles; and
reconfigure the replacement storage drive to operate in place of a failed storage drive among the plurality of non-hermetically-sealed storage drives in the hermetically-sealed chamber.

15. The storage assembly of claim 11, further comprising at least one spare storage drive included in the hermetically-sealed chamber along with the plurality of storage drives, wherein the at least one spare storage drive is configured to be used in place of a failed storage drive among the plurality of non-hermetically-sealed storage drives in the hermetically-sealed chamber.

16. The storage assembly of claim 11, further comprising at least one spare storage drive included in the hermetically-sealed chamber along with the plurality of storage drives, wherein:
the at least one spare storage drive is configured to be used in place of a failed storage drive among the plurality of non-hermetically-sealed storage drives in the hermetically-sealed chamber; and the at least one spare storage drive comprises a predetermined number of spare storage drives corresponding to the predetermined number of storage drive failures.

17. The storage assembly of claim 11, further comprising a fan unit configured to create airflow through the mass storage chassis assembly and around an outside of the hermetically-sealed chamber.

18. The storage assembly of claim 11, wherein the hermetically-sealed chamber is filled with a further gas or gas mixture.

19. The storage assembly of claim 11, wherein the mass storage chassis assembly is further configured to assign a selected replacement storage drive inserted into the non-hermetically-sealed outside deck as a replacement for at least one of the non-hermetically-sealed storage drives.

20. The storage assembly of claim 11, further comprising:
an interface module that is configured to communicatively couple an external system to at least the portion of the plurality of non-hermetically-sealed storage drives enclosed in the hermetically-sealed chamber.

* * * * *